United States Patent [19]
Sade

[11] 3,879,185
[45] Apr. 22, 1975

[54] APPARATUS FOR LENGTHENING CYLINDRICAL WORKPIECES

[75] Inventor: Maurice Sade, Lyon, France

[73] Assignee: Comptoir Lyonnais de Verrerie, Rhone, France

[22] Filed: Oct. 29, 1973

[21] Appl. No.: 410,383

[52] U.S. Cl. .................... 65/279; 65/283; 65/292
[51] Int. Cl. ........................................... C03b 23/04
[58] Field of Search ............ 65/279, 272, 283, 276, 65/292

[56] References Cited
UNITED STATES PATENTS

| 614,841 | 11/1898 | Conde | 65/283 |
|---|---|---|---|
| 1,055,402 | 3/1913 | Kimble | 65/279 |
| 1,688,190 | 10/1928 | Koenig | 65/279 |
| 2,103,585 | 12/1937 | Kimble et al. | 65/279 |

Primary Examiner—S. Leon Bashore
Assistant Examiner—Frank W. Miga
Attorney, Agent, or Firm—Karl F. Ross; Herbert Dubno

[57] ABSTRACT

Tubular glass blanks to be formed into pipettes are successively delivered at a feeding station to a pair of parallel transport rollers each comprising two coaxial disks with peripheral notches designed to receive the blanks. The transport rollers carry the blanks through a heating zone to a pair of diverging stretching rollers which form part of a drawing station and comprise each two parallel but axially offset peripherally notched disks whose centers lie on a line parallel to the axis of the transport rollers and whose notches are aligned parallel to the same axis. The extremities of the blanks are retained in the notches of the two sets of disks by stationary arcuate guides coacting with respective friction wheels which are sandwiched between the disk pairs of the several rollers and whose peripheries lie substantially on a common imaginary cylindrical surface with the disk peripheries so as to bear from within upon the blanks to set them in rotation about their own axes for uniform heating and stretching, at least one wheel of each station being driven from the associated disk pair via a speed-changing transmission.

9 Claims, 2 Drawing Figures

APPARATUS FOR LENGTHENING CYLINDRICAL WORKPIECES

FIELD OF THE INVENTION

My present invention relates to an apparatus for lengthening cylindrical workpieces of a thermally softenable material, such as glass, e.g., for the purpose of forming pipettes from glass tubes after they have been heated in their central portion which thus becomes elongated and reduced in diameter; by severing this central portion upon subsequent cooling, two symmetrical pipettes are obtained which can be used to pick up doses of liquids or viscous media.

BACKGROUND OF THE INVENTION

In making such pipettes by hand, a glass tube is first held above the flame to heat its central portion and is stretched after being removed from the flame until the diameter of that central portion is reduced to the desired extent. Under optimum working conditions, 30 to 40 pipettes per minute can be produced in this fashion.

Slightly higher production rates, e.g., of about 60 pipettes per minute, can be obtained with the aid of machinery using vertical cylinders which are internally provided with means for gripping, cutting and heating the glass tubes. The relatively low production rate of such machines is due to the fact that the pipettes are produced therein singly, rather than in pairs as with the aforedescribed manual method. Moreover, in such machines the difference in length between the original tube blank and the final product is limited by practical considerations since the stretching of the blank cannot be carried out fast enough to obtain length increases of several tens of centimeters (e.g., 42 cm in a specific instance) without relatively cumbersome and expensive equipment. Also, the need for gripping the blank at both extremities prevents it from being heated at the end so that a terminal portion must be wastefully cut off after the stretching process.

OBJECTS OF THE INVENTION

The general object of my present invention, therefore, is to provide an improved system for automatically lengthening glass tubes or similar workpieces in a symmetrical manner, with a reduction in thickness at the center, while avoiding the aforementioned drawbacks.

A more specific object is to provide simple and efficient machinery for producing pairs of pipettes at a high rate.

SUMMARY OF THE INVENTION

The foregoing objects are realized, in accordance with my present invention, by the provision of two treatment stations for tubular glass blanks or other cylindrical workpieces to be lengthened, i.e., a first station including feed means for advancing a succession of such workpieces along a predetermined path, with heating of the midportions of the advancing workpieces, and a second station including a pair of rotatable stretching members whose planes of rotation diverge in the direction of a continuation of that path. The stretching members are provided with peripheral formations, such as notches, for gripping the extremities of the centrally heated workpieces, arriving from the first station, and for progressively separating these extremities by advancing the workpieces along an imaginary cylinder surface having a centerline transverse to the direction of advance; in a preferred embodiment, in which these stretching members are designed as a pair of rollers (referred to hereinafter as drawing rollers), this imaginary cylinder surface has an elliptical cross-section. The stretched workpieces are successively unloaded on leaving the second station.

Advantageously, each of the two drawing rollers (whose axes converge in the direction of advance of the workpieces) comprises a pair of axially spaced corotating notched disks and a support wheel sandwiched therebetween, each roller being partly encircled by a stationary arcuate guide element located in the vicinity of the corresponding support wheel which peripherally contacts the workpiece extremities lodged in the notches of the disks. The support wheels, or at least one of them, may be rotated at a speed different from that of the associated disks and may be provided with a peripheral friction layer, such as a rubber band, for setting the workpieces in rotation about their individual axes in order to insure uniform stretching.

On account of the relative divergence or toeing of the drawing rollers, the two disks and the support wheel of each of these rollers must rotate about relatively offset axes; their midpoints, however, should all be located on a common transverse line representing the centerline or axis of the imaginary elliptical cylinder surface enveloping these rollers.

The feed means of the first station may comprise a pair of generally similar rollers, hereinafter referred to as transport rollers, which in contradistinction to the drawing rollers are disposed coaxially and which therefore may be mounted on a common shaft. Each transport roller advantageously has the same general construction as the drawing rollers, with a support wheel sandwiched between a pair of peripherally notched disks. Again, the support wheels of the transport rollers (or at least one of them) may be provided with peripheral friction layers and may be driven at a speed different from that of the associated disks to impart rotation to the peripherally engaged workpieces, such rotation in this instance serving to insure uniform heating.

In order to maintain the necessary synchronism between the several rollers of the two stations, they (or their disks) are preferably all connected to a common drive means which may also serve to rotate the workpiece-engaging traction wheels, e.g., via a gear transmission between these wheels and adjoining disks.

BRIEF DESCRIPTION OF THE DRAWING

The above and other features of my invention will now be described in detail with reference to the accompanying drawing in which.

SPECIFIC DESCRIPTION

Figure 1:
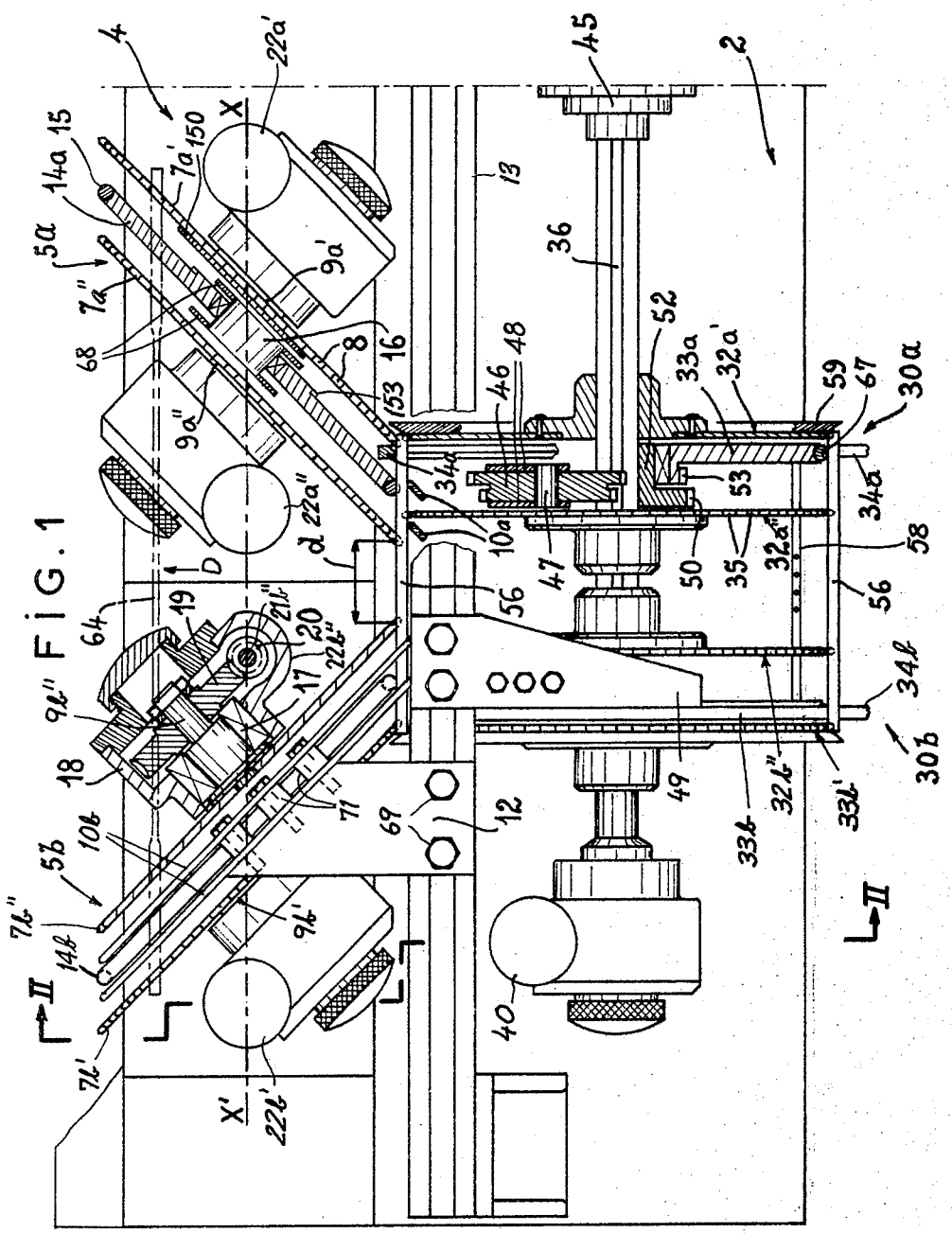
FIG. 1 is a top plan view (with parts broken away) of a machine for making pipettes in accordance with my invention.

The system shown in the drawing comprises a feeding station 2 and a stretching station 4, the two stations meeting at a transfer point A. Workpieces 56, in the form of tubular glass blanks, are successively delivered at an input C to feeding station 2 and, after transformation into enlongated bodies 65, are unloaded at an exit B. The loading and unloading means have been illustrated as chutes 60 and 66, respectively.

Feeding station 2 comprises a pair of coaxial transport rollers 30a, 30b, on a common shaft 36, consisting each of a pair of axially spaced disks 32a', 32a'' and 32b', 32b'' provided with peripheral notches 35. These angularly equispaced notches are all aligned, in a direction parallel to the disk axis, in order to receive the extremities of the oncoming blanks 56 which are to be transported over an arc of a little more than 180° by the disks whose clockwise rotation, as viewed in FIG. 2, has been indicated by an arrow 62. The blanks or workpieces 56 are retained in the notches 35 by stationary arcuate guide elements 34a, 34b which partly encircle respective support wheels 33a, 33b coaxially sandwiched between the disk pairs 32a', 32a'' and 32b', 32b''. Wheels 33a and 33b are freely journaled on the shaft 36, in a manner more fully described hereinafter with particular reference to wheel 33a, so as to be rotatable at a speed different from that of the disks. A rubber band or tire 67 forms a friction layer on the circumference of at least the wheel 30a and engages the workpiece extremities from within whereby, in response to relative rotation of the wheel and the disks, the blanks 56 lodged in notches 35 are made to turn about their individual axes parallel to the disk axis. This rotation of the blanks insures the uniform heating of their central portions by a set of burners 58 mounted in an arcuate array in a heating zone 3 on the guide elements 34a, 34b underneath the transport rollers 30a, 30b; for the sake of clarity only one such burner has been illustrated in FIG. 1.

The drive for the disks 32a', 32a'' and 32b', 33b'' includes a worm 25, powered by a nonillustrated motor, which meshes with a worm gear 24 keyed at the foot of a tubular column 22b' to a vertical shaft 21b' along with a gear 44 which in turn engages a gear 43 on another vertical shaft 39, the latter being journaled in a tubular column 40. Within that column, a worm 38 keyed to shaft 39 meshes with a worm gear 37 keyed to shaft 36. A gear 50, which together with the several disks is rotatably entrained by the shaft 36, has a hub 52 on which the support and traction wheel 33a is journaled so as to be rotatable relatively to the shaft; gear 50 meshes with a set of teeth (of relatively small diameter) on a stepped pinion 46 having another set of teeth (of relatively large diameter) in mesh with a gear 53 which is rigid with wheel 33a. Pinion 46 is journaled on a stub shaft 47 which is mounted in a bracket 48 depending from an adjustable plate 49. Thus, the rotary speed of the shaft 36 and the associated disks is stepped up by the gear train 50, 46, 53 to drive the wheel 33a at a faster rate whereby workpieces 56 are caused to spin as their central portions are exposed to the heat from burners 58.

The companion wheel 33b is advantageously driven from shaft 36 through a similar gear transmission not shown.

Figure 2:
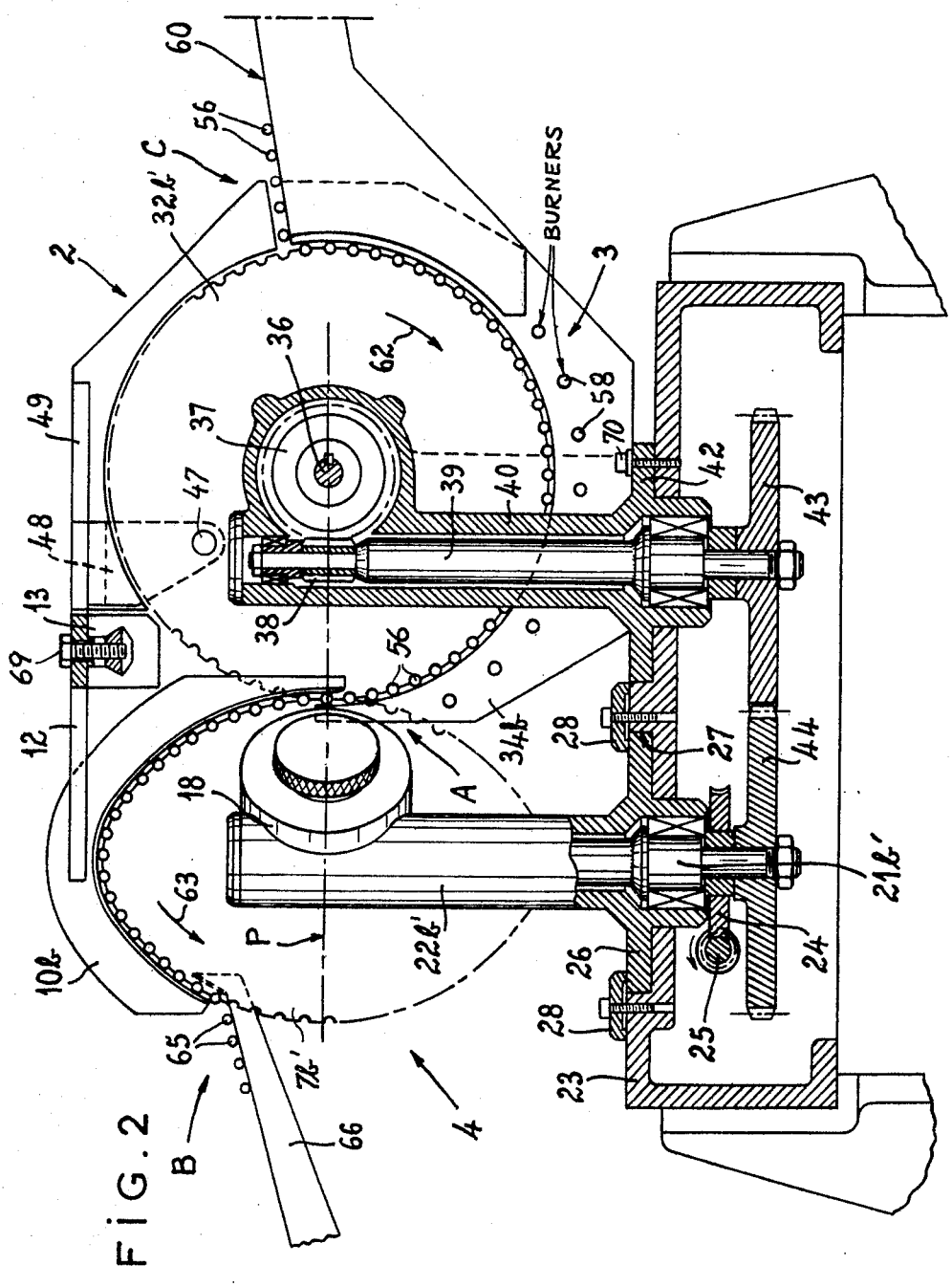
FIG. 2 is a cross-sectional view taken on the line II—II of FIG. 1.

Stretching station 4 comprises a pair of drawing rollers 5a, 5b whose axes converge in the direction of workpiece advance indicated by an arrow D in FIG. 1; these axes and that of shaft 36 lie in a common plane P (FIG. 2). The construction of each drawing roller 5a, 5b is generally similar to that of the transport rollers 30a, 30b, except that the disks 7a', 7a'' and 7b', 7b'' of these drawing rollers are axially offset from each other in order to position the midpoints or centers of these disks on a common line X—X' perpendicular to the direction D. Line X—X', which is also transverse to a central plane of symmetry parallel to transport rollers 30a, 30b, is the centerline or axis of an imaginery cylinder surface of elliptical cross-section which corresponds to the outline of disk 7b' as seen in FIG. 2 and which in the transfer zone A is tangent to another imaginary cylinder surface (of circular cross-section) corresponding to the outline of disk 32b' as seen in the same Figure. The tangency of these two cylinder surfaces, which pass through the longitudinal midplanes of the workpieces 56, insure the smooth transition of these workpieces from the drawing rollers to the transfer rollers. This transition is facilitated by the angular overlapping of guide elements 34a, 34b, which envelop the wheels 33a and 33b, with similar but diverging guide elements 10a, 10b partly encircling two support wheels 14a and 14b from above. The wheels 14a and 14b, provided with peripheral rubber bands 15, are respectively sandwiched between the disk pairs 7a', 7a'' and 7b', 7b'' of rollers 5a and 5b, being rotatable about the centerline X—X' at a speed different from that of the disks to maintain the rotation of the workpieces about their individual axes. Thus, as particularly illustrated for the wheel 14a, each of these wheels is rotatably journaled on a hub 16 carried by a bracket 68 which is suspended from a slider 12 also supporting the associated guide elements 10a, 10b; the latter are constituted by respective pairs of arcuate rails with relatively offset centers of curvature lying on the line X—X'.

Because of the axial disalignment of the disks of each drawing roller, these disks are mounted on separate shafts 9a', 9a'' and 9b', 9b''. The shafts of each pair, in turn, are disposed symmetrically with reference to the hub 16 of the associated support wheel. Again, either or preferably both support wheels 14a, 14b are positively driven through a step-up transmission, similar to that described above with reference to wheel 33a, which in the specific instance of wheel 14a includes a set of gear teeth 153 on that wheel meshing with a nonillustrated stepped pinion also engaging a set of gear teeth 150 on disk 7a'.

Shaft 9b'', which is representative of all four disk shafts, is shown journaled in a bearing 17 within a housing 18 forming an extension of a column 22b'' similar to columns 22b' and 40, two other such columns 22a', 22a'' being provided for the drives of disks 7a' and 7a''. Shaft 9b'' carries a worm gear 19 in mesh with a worm 20 on a shaft 21b'' which, through a nonillustrated gear train in machine bed 23, is coupled with gear 44 on shaft 21b'. The corresponding shafts in columns 22a' and 22a'' are likewise mechanically connected with gear 44 through a suitable transmission within bed 23 insuring synchronous rotation of all four disks about their respective axes, thereby maintaining strict alignment between peripheral notches 8 thereof which receive the workpieces 56 from transport rollers 30a and 30b. With the extremities of these workpieces firmly clamped in the notches and held against the friction layers 15a, 15b of wheels 14a, 14b by the guide elements 10a, 10b, they are progressively drawn apart so that the tube blanks are lengthened into the elongated bodies 65 with reduced central portions 64 which are subsequently severed to split each body into a pair of pipettes. The finished workpieces 65 are unloaded at exit B by the chute 66 which consists of a pair of arms with beveled tops reaching between the disks 7a', 7a'' and 7b', 7b'' to lift the workpiece extremities out of their notches at the ends of guides 10a, 10b.

The wheel-supporting sliders 12 (only one shown), integral with mounting plates 49, are adjustably mounted on a horizontal bar 13 to which they are fastened by screws 69 with a relative spacing depending upon the length of the oncoming blanks 56; columns 22a', 22a'', 22b' and 22b'' are similarly adjustable by having their bases 26 (as illustrated for column 22b') releasably clamped with the aid of lugs 28 to the machine bed 23 along which they can be laterally displaced to vary the length d of the central blank portions. Column 40 has a base 42 secured to the bed 23 by screws 70 (only one shown); transport rollers 30a and 30b, however, can be shifted along shaft 36 in accordance with the lateral displacement of drawing rollers 5a and 5b.

The guide elements 10a and 10b, which are mounted on the sliders 12 with the aid of screws 71, can be replaced by other guide elements of different arc length if it is desired to increase or reduce the degree of elongation of the workpieces. Naturally, the maximum arc length between transfer point A and exit point B is 180° since the peripheral spacing of the drawing rollers decreases along the lower half of the drawing rollers whose counterclockwise rotation has been indicated by arrow 63 in FIG. 2.

With the system described above and illustrated in the drawing I have been able to produce pipettes at a rate of about 600 pieces (corresponding to 300 blanks) per minute. It should be noted, however, that this system is not limited to the manufacture of pipettes and that workpieces of a heat-softenable material other than glass could be similarly treated thereby. Moreover, the specific embodiment here disclosed is susceptible of various modifications which will be readily apparent to persons skilled in the art. Thus, for example, constructing the diverging drawing members 5a, 5b as rollers is preferred for the sake of simplicity and efficiency, but the essential requirement is only that their peripheries define an imaginary cylindrical surface along which the workpieces are advanced parallel to themselves.

I claim:
1. An apparatus for lengthening cylindrical workpieces of a thermally softenable material, comprising:
   stretching means and conveying means for transferring the workpieces to said stretching means;
   said conveying means including a pair of parallel rotatable feed members provided with equispaced peripheral notches engageable with respective extremities of a succession of said workpieces;
   heating means between said feed members for thermally softening the midportions of the workpieces so engaged;
   said stretching means including a pair of rotatable stretching members provided with equispaced peripheral notches engageable with said extremities, said stretching members having their peripheries located in respective planes of rotation which diverge in opposite directions from a central plane parallel to said feed members, the peripheries of said stretching members approaching the peripheries of said feed members at a transfer point for gripping the extremities of the thermally softened workpieces and progressively separating said extremities while advancing said workpieces with their axes moving along part of an imaginary cylinder surface having a centerline transverse to said central plane;
   drive means for coordinatedly rotating said feed members and said stretching members; and
   unloading means for the stretched workpieces at a location along said stretching members remote from said transfer point.

2. An apparatus as defined in claim 1 wherein said stretching members are a pair of drawing rollers centered on axes converging in a direction away from said conveying means, said imaginary cylinder surface being of elliptical cross-section.

3. An apparatus as defined in claim 2, further comprising stationary arcuate guide elements partly encircling said drawing rollers for holding said extremities in said notches on their way from said conveying means to said unloading means.

4. An apparatus as defined in claim 3 wherein said feed members are a pair of coaxial transport rollers, said conveying means further including stationary arcuate guide elements partly enveloping said transport rollers for holding said extremities in the notches thereof during movement of said workpieces to said stretching means, the guide elements of said conveying means peripherally overlapping the guide elements of said stretching means at said transfer point, said transport rollers being linked with said drawing rollers for joint rotation by said drive means to advance said workpieces along an imaginary cylinder surface of circular cross-section tangent at said transfer point to said imaginary cylinder surface of elliptical cross-section.

5. An apparatus as defined in claim 4 wherein the rollers of at least one of said pairs each comprise two axially spaced corotating peripherally notched disks and a support wheel close to the associated guide element sandwiched between said disks, said support wheel being dimensioned to make peripheral contact with the extremities of said workpieces lodged in the notches of said disks.

6. An apparatus as defined in claim 5 wherein the support wheels of said one pair of rollers are mounted for rotation at a speed different from that of said disks, at least one of said wheels being provided with a peripheral friction layer and being coupled with said drive means for setting the workpieces carried by said disks in rotation about their individual axes within the peripheral notches thereof, said friction layer being located at the level of said notches for urging said extremities against the associated stationary guide element.

7. An apparatus as defined in claim 6 wherein the coupling between said one of said support wheels and said drive means comprises a stepped pinion between the associated notched disks and a pair of gears in mesh with said pinion, said gears being respectively rigid with said one of said support wheels and with at least one of said associated notched disks.

8. An apparatus as defined in claim 3 wherein said drawing rollers each comprise a pair of axially spaced corotating peripherally notched disks of like diameter with relatively offset axes and with midpoints on said centerline, said disks being separately coupled to said drive means.

9. An apparatus as defined in claim 8 wherein said drawing rollers each further comprise a support wheel close to the associated guide element sandwiched between said disks and parallel thereto, said support wheel being mounted for rotation about said centerline at a speed different from the disk speed and being dimensioned to make peripheral contact with the extremities of said workpieces lodged in the peripheral notches of said disks, the support wheel of at least one of said drawing rollers being provided with a peripheral friction layer and being coupled with said drive means for setting said workpieces in rotation about their individual axes within said notches, said friction layer being located at the level of said notches for urging said extremities against the associated stationary guide element.

* * * * *